(12) United States Patent
Wang et al.

(10) Patent No.: US 11,775,540 B2
(45) Date of Patent: Oct. 3, 2023

(54) MINING PATTERNS IN A HIGH-DIMENSIONAL SPARSE FEATURE SPACE

(71) Applicant: Microsoft Technology Licensing, LLC, Redmond, WA (US)

(72) Inventors: Jiechun Wang, Redmond, WA (US); Tomasz Drabas, Seattle, WA (US); Giancarlo Devich, Rogers, AR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 281 days.

(21) Appl. No.: 15/909,681

(22) Filed: Mar. 1, 2018

(65) Prior Publication Data

US 2019/0272339 A1     Sep. 5, 2019

(51) Int. Cl.
| | | |
|---|---|---|
| G06F 16/24 | (2019.01) | |
| G06F 16/2458 | (2019.01) | |
| G06F 16/22 | (2019.01) | |
| G06F 18/22 | (2023.01) | |

(52) U.S. Cl.
CPC ...... *G06F 16/2465* (2019.01); *G06F 16/2246* (2019.01); *G06F 18/22* (2023.01)

(58) Field of Classification Search
None
See application file for complete search history.

(56) References Cited

U.S. PATENT DOCUMENTS

| | | | | |
|---|---|---|---|---|
| 9,843,596 B1 * | 12/2017 | Averbuch | | G06F 21/554 |
| 10,284,585 B1 * | 5/2019 | Kennedy | | H04L 63/145 |
| 2001/0047355 A1 * | 11/2001 | Anwar | | G06T 11/206 |
| 2002/0004793 A1 * | 1/2002 | Keith, Jr. | | G06F 16/2246 |
| | | | | 707/999.005 |
| 2003/0028531 A1 * | 2/2003 | Han | | G06F 16/2465 |
| | | | | 707/999.102 |
| 2004/0267770 A1 * | 12/2004 | Lee | | G06F 16/2465 |
| 2010/0179955 A1 * | 7/2010 | Wu | | G06F 16/2465 |
| | | | | 707/E17.046 |
| 2012/0278346 A1 * | 11/2012 | Han | | H04L 67/10 |
| | | | | 707/758 |

(Continued)

OTHER PUBLICATIONS

C. F. Ahmed, S. K. Tanbeer, B. -S. Jeong and Y. -K. Lee, "Efficient Tree Structures for High Utility Pattern Mining in Incremental Databases," in IEEE Transactions on Knowledge and Data Engineering, vol. 21, No. 12, pp. 1708-1721, Dec. 2009, doi: 10.1109/TKDE.2009.46. (Year: 2009).*

(Continued)

*Primary Examiner* — Alford W Kindred
*Assistant Examiner* — Cao D Vuong

(57) ABSTRACT

Disclosed are systems and methods for data mining a plurality of records to identify one or more patterns. A list of frequent items is generated using the records of a certain subpopulation in a dataset of the records. By scanning through the dataset, a prefix tree is generated based on the list of frequent items. Each node in the prefix tree includes an accumulator which maintains separate counts of records from the subpopulation matching the respective node and of records from the plurality of records matching the respective node. One or more population-normalized frequent patterns associated with the plurality of records are extracted based on a traversal of the prefix tree.

20 Claims, 8 Drawing Sheets

(56) References Cited

U.S. PATENT DOCUMENTS

| | | | | |
|---|---|---|---|---|
| 2015/0324403 A1* | 11/2015 | Xiao | ................... | G06F 16/2246 |
| | | | | 707/722 |
| 2016/0224637 A1* | 8/2016 | Sukumar | ............. | G06F 16/2465 |
| 2016/0253366 A1* | 9/2016 | Hsu | ................... | G06K 9/00496 |
| | | | | 707/797 |
| 2017/0199902 A1* | 7/2017 | Mishra | .................... | G06N 5/01 |
| 2017/0270181 A1* | 9/2017 | Lindner | ................ | G06F 16/215 |
| 2018/0107695 A1* | 4/2018 | Yang | ................... | G06F 16/2465 |
| 2018/0285424 A1* | 10/2018 | Wang | ................. | G06F 16/2465 |

OTHER PUBLICATIONS

W. Cheung and O. R. Zaiane, "Incremental mining of frequent patterns without candidate generation or support constraint," Seventh International Database Engineering and Applications Symposium, 2003. Proceedings., 2003, pp. 111-116, doi: 10.1109/IDEAS .2003.1214917. (Year: 2003).*

Han, et al., "Mining Frequent Patterns without Candidate Generation", In Proceedings of the ACM SIGMOD International Conference on Management of Data, vol. 29, Issue 2, 2000, 12 Pages.

\* cited by examiner

MINING PATTERNS IN A HIGH-DIMENSIONAL SPARSE FEATURE SPACE

BACKGROUND

The vast amount of collected data from devices, people, and businesses has made it nearly impossible for a human being alone to perform any meaningful analysis of the collected data, as was done in the past. This predicament has led to the development of data mining and associated tools. Data mining relates to the process of collecting and exploring large quantities of data in order to discover meaningful information about the data that is generally in the form of relationships, patterns, and rules. Data mining attempts to uncover frequent patterns present in the data while removing missing data and observations with noise. "Frequent patterns" are sequences of data items that occur in a database at a relatively high frequency. Discovery of frequent patterns, also referred to as frequent pattern searching or mining, has become important in many fields, and it is often desired to find frequently occurring patterns in very large data sets.

One technique for frequent-pattern mining, referred to as the "Apriori" approach, uses a "downward closure" property, which means so that any subset of frequent itemsets is also considered frequent. Essentially, this approach is to iteratively generate a set of candidate patterns of length (k+1) from a set of frequent-patterns of length k, and to check their corresponding occurrence frequencies in the database. However, Apriori algorithms are very computationally expensive and consume large amounts of memory, especially when large numbers of patterns exist. That is, it may be costly to handle huge numbers of candidate sets which are inherent during candidate generation. For example, if there are $10^4$ frequent itemsets of length-1, the Apriori algorithm may need to generate more than $10^7$ itemsets of length-2, and test their occurrence frequencies in the database.

Other techniques may mine frequent patterns by pattern fragment growth using an extended prefix-tree data structure that stores the itemset association information. This approach, referred to as the "FP-growth" algorithm, compresses an input database into an FP-tree instance to represent frequent items. Then, it divides the compressed database into a set of conditional databases, each one associated with one frequent pattern. Finally, each such database is mined separately. While popular, this approach has drawbacks as well. For instance, it has been determined that the FP-growth algorithm is unable to efficiently find patterns among a certain grouping in an input database which accounts for the popularity of those patterns in the larger context of the entire input database.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for data mining a plurality of records to identify one or more patterns is provided. The method includes determining a subpopulation in the plurality of records. The subpopulation includes a subset of the records having an indication in each record of whether the respective record is a member of the subpopulation, and each record includes a plurality of items. The method further includes generating a list of frequent items using the records of the subpopulation, and generating a prefix tree using the plurality of records and based on the list of frequent items generated using the records of the subpopulation. Each node in the prefix tree includes an example accumulator having at least: (i) a first count of records from the subpopulation matching the respective node and (ii) a second count of records from the plurality of records matching the respective node. It should be noted that, in other implementations, additional accumulators for additional subpopulations may be added to each node. The method further includes extracting one or more population-normalized frequent patterns associated with the plurality of records based on a traversal of the prefix tree.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
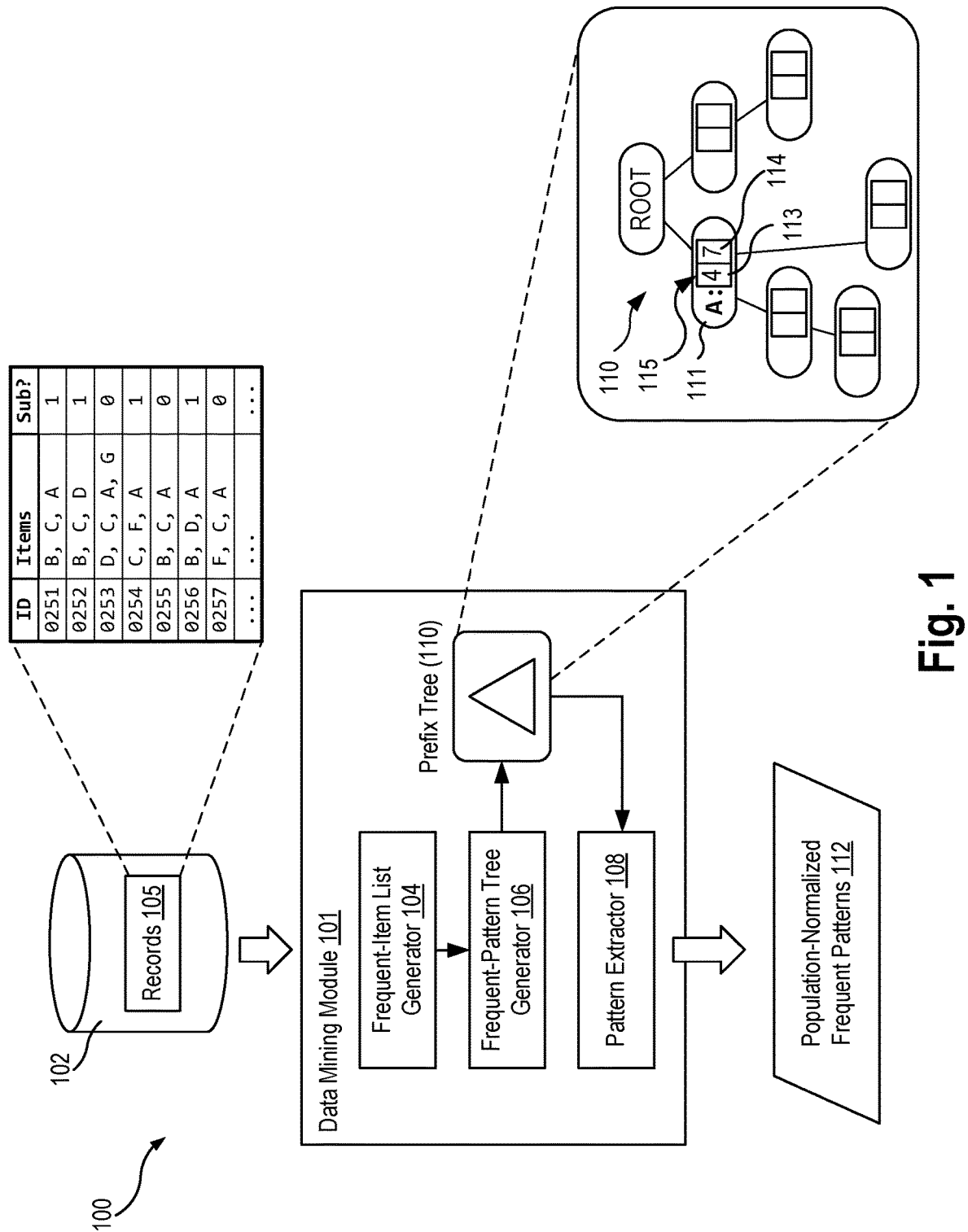
FIG. 1 is a block diagram of a system for data mining a plurality of records to identify one or more patterns according to an exemplary aspect.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Aspects of the present disclosure provide a technique for analyzing data to discover patterns in a subpopulation of the data in a manner that accounts for the overall popularity of patterns in the general population of the data. In one use case, the described technique might be used to analyze metrics collected from personal computers (PCs) to find common patterns among PCs that have tried but ultimately failed to upgrade to a new operating system version. The described system is provided with a dataset of records that includes information known about all the PCs that attempted the upgrade, including all hardware, driver, and software information, along with device census metadata. This dataset can be an extremely high-dimensional (in order of tens of millions of columns) and sparse feature space. The described technique enables a system to extract patterns from the hardware and software configurations of the population that was unsuccessful in upgrading, in a manner that accounts for the overall popularity of the pattern in the total population of addressable PCs (i.e., general population). The disclosed system and technique reduces the complexity and space requirements of known algorithms, such as a conventional Frequent-Pattern (FP-growth) algorithm, and results in significantly improved execution times.

The described system and technique uses two passes through a dataset of records. In the first pass through the dataset, a frequent-item list is generated using all records from the subpopulation. The records may have a field indicating whether the respective record is a member of the subpopulation (such as a Boolean value for "Failed to Upgrade"). In the second pass through the dataset, a special type of prefix tree is generated using the entire dataset of records (both general population and subpopulation) and based on the frequent-item list (which was generated using just the records of the subpopulation). The system and technique uses an accumulator data structure (e.g., a Monoid algebraic structure) to accumulate counts of both (1) subpopulation records that match the respective prefix, and (2) general population records that match the respective prefix. After building the prefix tree, one or more subpopulation-normalized frequent patterns for the dataset of records are extracted by traversing the prefix tree, summing respective subpopulation counts, and summing general-population counts. By building the prefix tree as herein described, the system and technique is able to accumulate counts in a single pass through the dataset while building the prefix tree, resulting in an upper-bound $2^{nd}$-degree polynomial complexity of the described technique. This is in contrast to a traditional FP-growth algorithm that would exhibit $3^{rd}$-degree polynomial complexity, if the original FP-growth algorithm were to produce population-normalized results. The two approaches differ by a factor of p (where "p" is the number of extracted resulting patterns), which can be very large as the upper bound for these patterns is a combination of all distinct frequent items.

Figure 2:
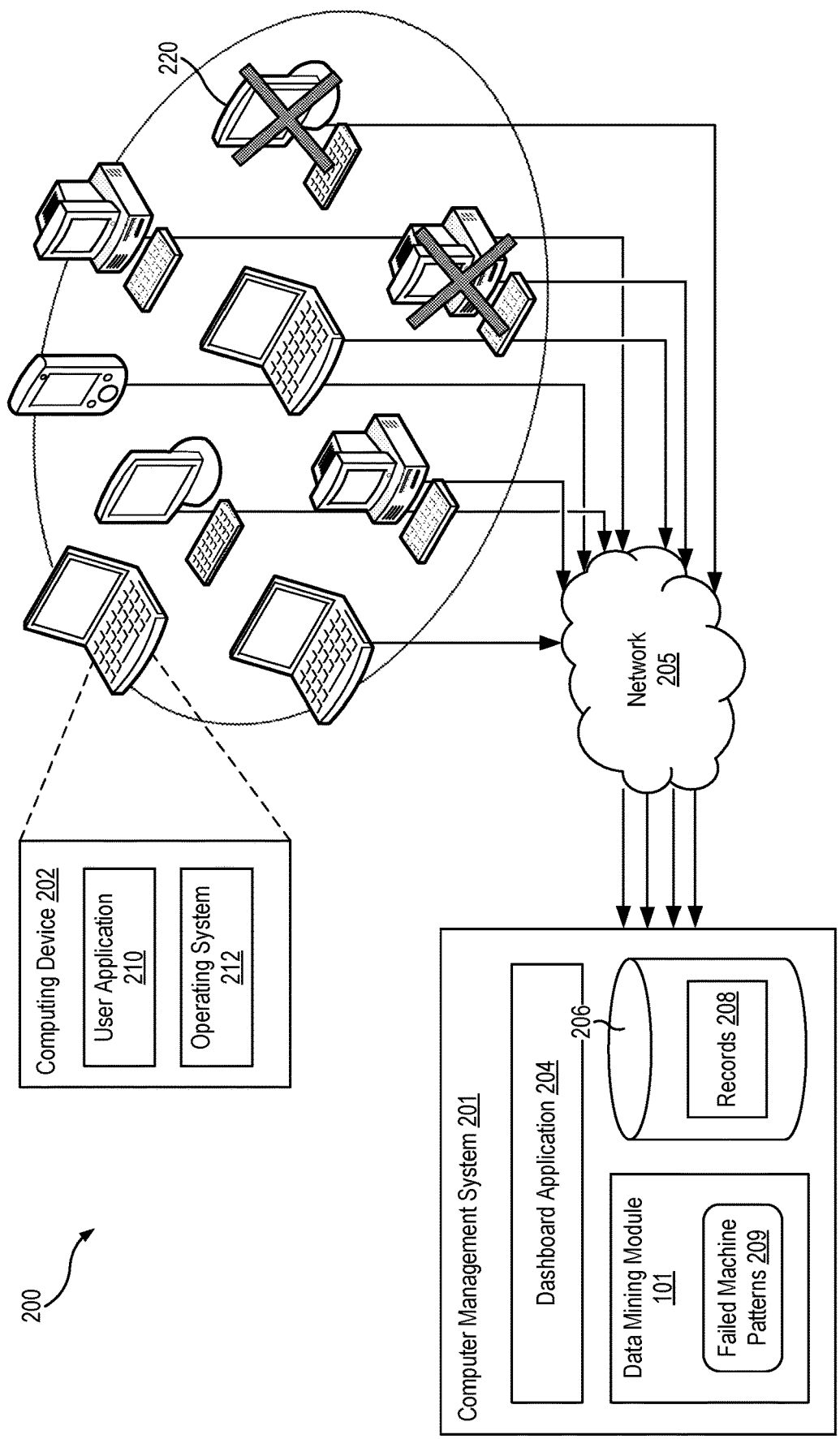
FIG. 2 is a block diagram of an exemplary use case of a system for mining computer metrics to identify patterns of hardware and software configurations in failed machines, according to an exemplary aspect.
Figure 3:
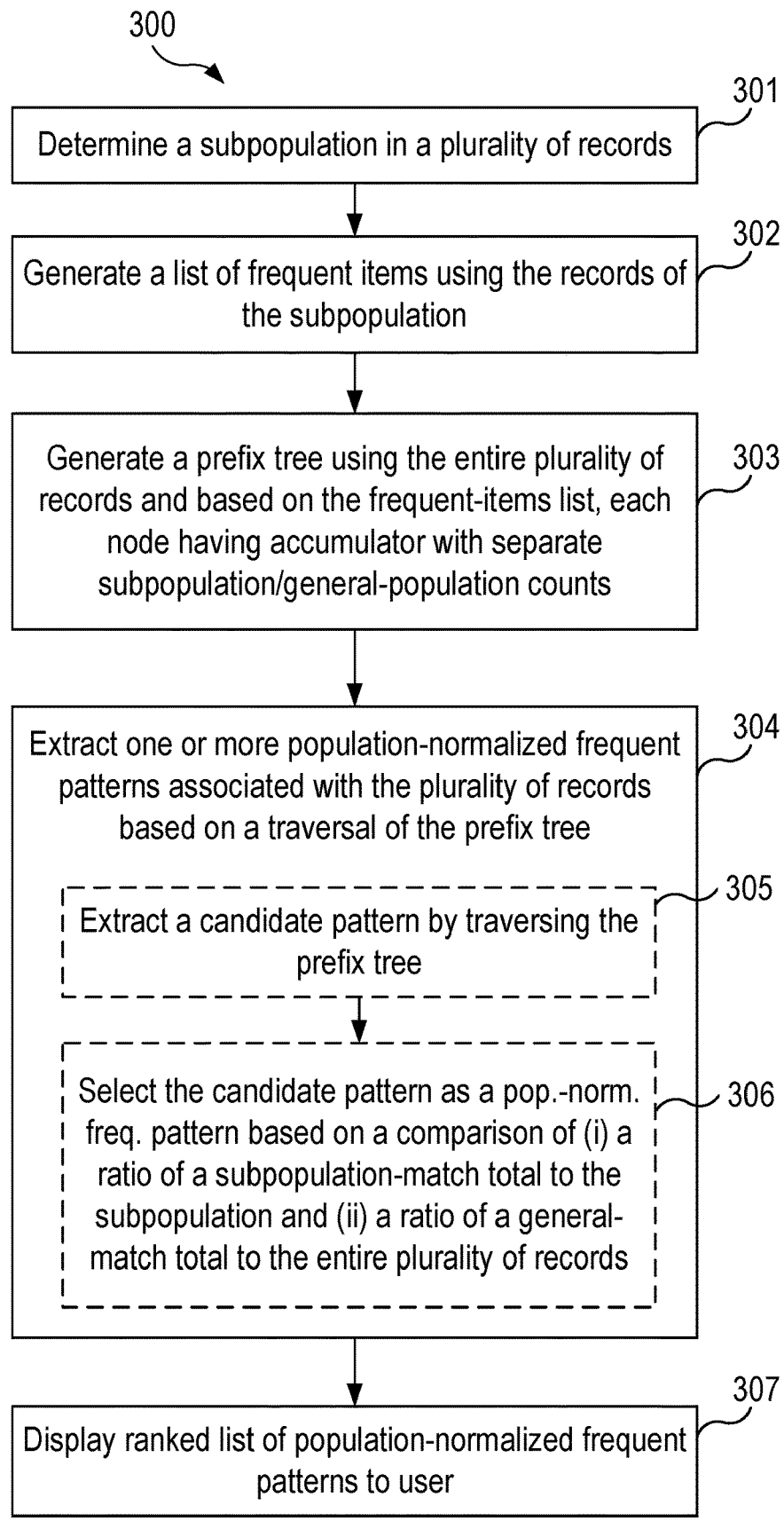
FIG. 3 is a flowchart of an example of a method for data mining a plurality of records to identify one or more patterns according to an exemplary aspect.
Figure 4:
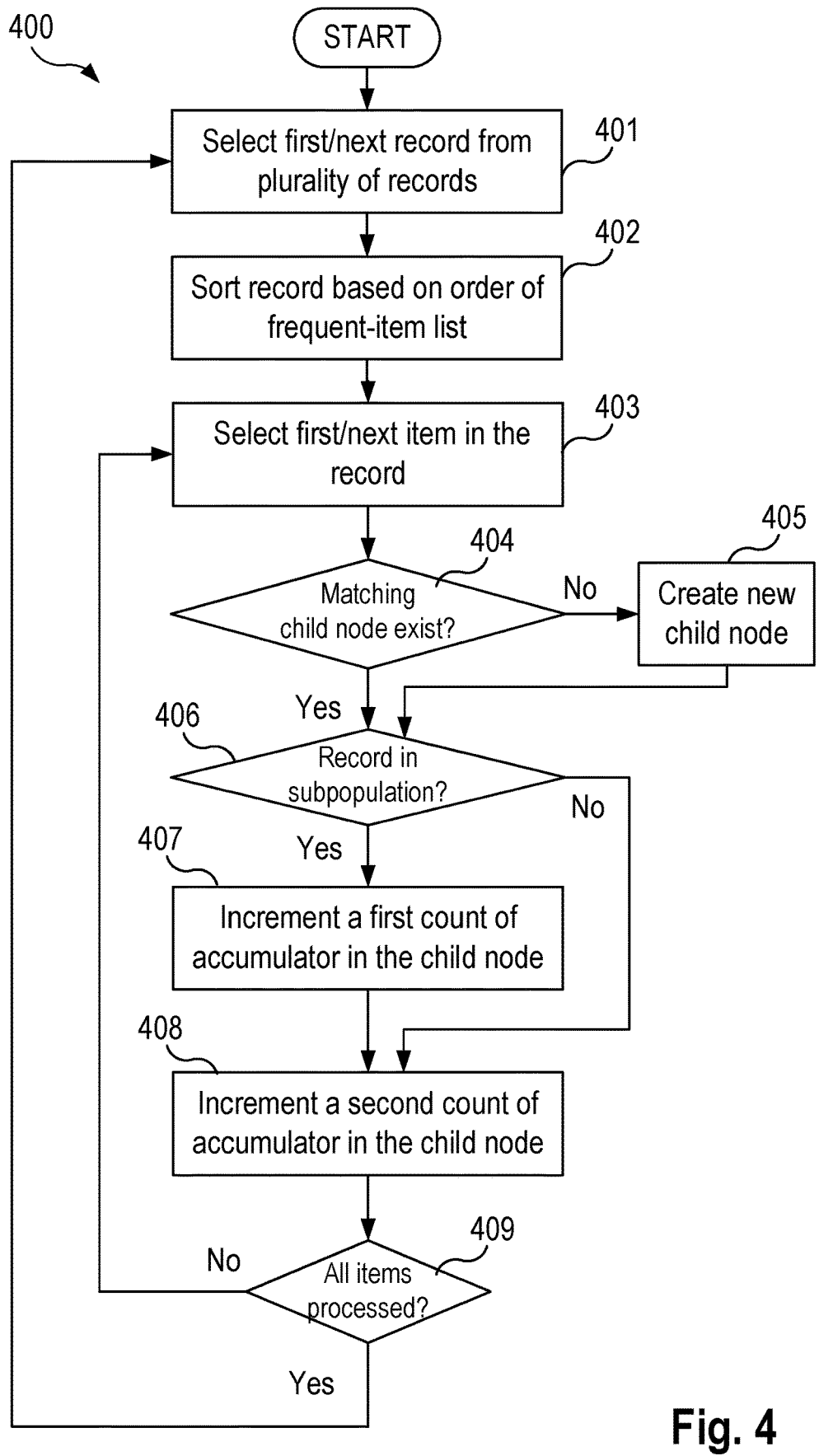
FIG. 4 is a flowchart of an example of a method for generating a prefix tree for extracting population-normalized frequent patterns from a dataset of records, according to an exemplary aspect.

Turning now to FIGS. 1-6, examples are depicted with reference to one or more components and one or more methods that may perform the actions or operations described herein, where components and/or actions/operations in dashed line may be optional. Although the operations described below in FIGS. 3-4 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a block diagram of a system 100 for data mining a plurality of records to identify one or more patterns according to an exemplary aspect. The system 100, which may be implemented in one or more computer devices, includes a data mining module 101 configured to analyze a dataset of data records 105 in a data store 102 (e.g., a storage device) and generate one or more population-normalized frequent patterns 112.

Each record 105 in the dataset contains a plurality of data items (represented generically with characters A, B, C, etc.). For example, each record may have a unique record identifier (ID). Further, for example, the individual data items may comprise text, strings, numbers, Booleans, and other values. In addition to respective data items, each record may include some indication, such as a value in a column, of whether the respective record is a member of a particular subpopulation (i.e., the "Sub?" column shown in FIG. 1, where "1" corresponds to a member and "0" corresponds to not being a member). The process of frequent pattern mining identifies patterns of data items that occur frequently in different records of the data set. Particularly, frequent pattern mining may be used to identify patterns of data items that occur frequently in records of a specific subpopulation of the data set. Such patterns can be used to determine correlations or even causations of that subpopulation For example, it may be desired to find common hardware and software patterns on machines, e.g., PCs, that suffer a failure or error during execution of software for the purposes of debugging that software.

In one aspect, the data mining module 101 may include a frequent-item list generator 104 configured to identify frequent data set items, a frequent-pattern tree generator 106 configured to identify patterns within the data set records, and a pattern extractor 108 configured to extract frequent patterns from the identified patterns. More specifically, the data mining module 101 may be configured to retrieve one or more records 105 from the data store 102, and, in an example, use the frequent-item list generator 104 to generate a list of frequent items using the records from a subpopulation of the records 105. The frequent-pattern tree generator 106 may be configured to generate a prefix tree 110 using the records 105 and based on the list of frequent items. The pattern extractor 108 may be configured to extract one or more population-normalized frequent patterns 112 associated with the records 105 based on a traversal of the prefix tree 110. In an example, the population-normalized frequent patterns 112 indicate patterns of commonly occurring items in a designated subpopulation of records, which factor in the popularity or frequency of those patterns within the larger context of the general population of records.

In an example, the prefix tree 110 includes a plurality of nodes 111 in a hierarchical arrangement. It is understood that other suitable types of tree-like data structures besides prefix trees may be used. Paths of nodes in the prefix tree 110 represent the items found in each record. Each node may further include an accumulator 115 that maintains separate counts of subpopulation and/or general population (elements 113, 114, respectively) that track their respective frequency in the dataset of records 105. In an aspect, each node 111 of the prefix tree may have a label (e.g., "A") identifying an item of a record which matches that corresponding node.

In some aspects, the accumulator 115 may be a specialized container of a given data type that is configured with at least the following properties: (i) there is a pre-defined "identity" container of the given type; (ii) there is a predefined "combine" operator that can take any two containers of the same given type, and generates another container of the same type. In an aspect, the container also follows these restrictions:

(1) the "combine" operator is commutative: (x combine y)=(y combine x);

(2) the "combine" operator is associative: ((x combine y) combine z)=(x combine (y combine z));

(3) when the "combine" operator takes a container x and the identity container i, the output will be x itself: (x combine i)=(i combine x)=x.

In one aspect, the accumulator 115 may be implemented using a Monoid algebraic structure having these identity and combine properties described earlier. The accumulator 115 of a node may allow the node to contain multiple (e.g., two) numeric values per node. In an example, the accumulator 115 can be defined as a Monoid of the structure (failCount, totalCount), where failCount is a count of the failure instances (i.e., subpopulation), and totalCount is a count of total instances (i.e., plurality of records). In this case, the "identity" container would be (0,0), and the combine operator is a component-wise addition of accumulators:

$$\text{combine}(X,Y)=(X.\text{failCount}+Y.\text{failCount},X.\text{totalCount}+Y.\text{totalCount})$$

In the present disclosure, the accumulator 115 in a node can be expressed using the notation {M, N}, where M is a count of records from the subpopulation matching the respective node, and N is a count of records from the general population matching the respective node. For example, the node 111 depicted in FIG. 1 has an accumulator with the value {4, 7} representing a subpopulation count of "4" and a general population count of "7."

Aspects of the present disclosure enable finding overrepresented patterns in high-dimensional and sparse subpopulations with respect to the general population. One use case of this technique can be finding common hardware and software patterns on machines, e.g., PCs, that fail to upgrade to a new version of an application or operating system (e.g., Windows 10), which is discussed in further detail in conjunction with FIG. 2. Another use case of the described technique can be detecting fraudulent credit-card transactions. Using the described technique, one could mine fraudulent transactions to find abnormal patterns and discount those patterns that are also common for those that are not fraudulent. This may assist with narrowing down specific patterns of events and potentially put blocks in place so in the future, such transactions are rejected.

FIG. 2 is a block diagram of an exemplary use case of a system 200 for mining computer metrics to identify patterns of hardware and software configurations in failed machines, according to an exemplary aspect. The system 200 includes a computer management system 201 configured to facilitate the management and/or monitoring of a plurality of computing devices 202 communicatively connected to the system 201 via a network 205.

In an example, each computing device 202 include an operating system 212 configured to support execution of one or more user application(s) 210. In an example, the computing devices 202 may be any of a personal computer, server, desktop, laptop, handheld device, tablet device, smartphone, set-top box, gaming device, or any other electronic device suitable for executing software program code. In some aspects, the network 205 may include, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

In an aspect, the computer management system 201 may include a dashboard application 204 configured to collect data records 208 from the computing devices 202 and store the records in a storage system 206. In an example, the data records 208 may be collected periodically, or in response to a specific action, such as a system failure, software crash, abnormal shutdown, or even in response to positive events, such as a successful installation of an operating system or software application. Each data record 208 may include statistics, diagnostic data, telemetry data, or other values of metrics representing the performance and status of a respective computing device. In cases of a system failure or error, a data record 208 may include status codes, error codes, exceptions, stack dumps, log messages, and other indications of the state of the computing device 202.

Additionally, each data record 208 from a computing device 202 may include metadata describing the computing device itself. In an example, the data records 208 may include metadata indicating the hardware and software configurations of the computing device 202. In an example, a data record 208 may include software inventory information of all applications installed on the computing device 202 (e.g., name, vendor, version); a listing of all hardware devices installed on the computing device 202 (e.g., device vendor, model number) which may include information about device drivers, properties, and capabilities; a current version of the operating system 212; a unique device identifier associated with computing device 202; and other metadata.

In an aspect, the dashboard application 204 may be configured to monitor one or more specific metrics associated with the operation of the user applications 210 and/or operating system 212 across all the computing devices. A metric may have a specified target or threshold value (for example, as specified by the software provider of the user application or operating system). In an example, a metric may have a target continuous value range (e.g., "CPU load less than X in than Y % of machines"), or may have a discrete status value (e.g., success/failure). If that target is breached, the dashboard application 204 may generate a notification (alert), as well as perform pattern analysis on the data records 208 using the techniques described herein to determine what is common across the machines that have had the same or a similar kind of problem.

In an aspect, the computer management system 201 may use the data mining module 101 to analyze the data records 208 to identify population-normalized frequent patterns 209 in the hardware and software configurations of "failed" computing devices. In this case, these population-normalized frequent patterns factor in the popularity of the hardware and software configuration within the general population of computing devices. For brevity of explanation, a "failed" computing device (depicted as element 220) can refer to not only a computing device reporting a particular error or failure of a certain hardware or software component, but also to a computing device that reports a metric value that breaches or surpasses a pre-determined threshold value, for example, as configured by a system administrator. Such computing devices may also be referred to as a "failed" computing device "with respect to a given metric." Non-failed computing devices may be herein referred to as "successful" computing devices.

Consider an example of 1 million machines: 10,000 machines reported failing to upgrade to a particular version of an operating system, and 990,000 machines reported a successful upgrade (i.e., an overall failure rate of 1%). A conventional frequent pattern algorithm might find that, out of those 10,000 machines that failed to upgrade, 5,000 of them had GPU X with a driver Y and a specific version of Web Browser Z (i.e., accounting for 50% of all machines that failed). One might then draw a (false) conclusion that such machines fail more often than the others. However, if it turned out that, out of those 1 million machines that attempted to upgrade, 600,000 machines had GPU X with driver Y and the same version of Browser Z (i.e., 60% of all machines that tried to upgrade), then this would mean that the 5,000 failed machines match this pattern because they are popular in the general population of machines and not because they fail more often. In fact, machines matching this pattern of GPU, driver, and browser are actually under-represented (i.e., 50% vs. 60%) in the subpopulation of failed machines.

On the other hand, consider an example of 500 failed machines that had an anti-virus software Z and network card W (i.e., constituting only 5% of all failures). If the general population has only 5,000 machines having configuration of Z and W hardware/software (i.e., 0.5% of machines), then it may be concluded that such a pattern is over-represented in the failing population, thereby inferring some correlation with the system failure and this particular stack of the anti-virus software Z and network card W. The techniques described herein perform data mining on diagnostic and telemetry data to facilitate such analysis of computing systems.

While traditional pattern mining techniques, such as FP-growth, could be used to find patterns among machines that, for example, fail to upgrade to a new version of an operating system, it has been determined that such algorithms fail to account for the popularity of such patterns in the general population of all machines having that operating system. To perform the above-described analysis using the conventional FP-growth algorithm, the analysis would first need to mine the patterns in the failing population, and then count the number of PCs that match resulting patterns in the general population. This is very costly in time and resources, as it would exhibit $3^{rd}$-degree polynomial complexity since the number of resulting patterns is typically very big with the upper bound being the combination of all distinct frequent items.

FIG. 3 is a flowchart of an example of a method 300 for data mining a plurality of records to identify one or more patterns according to an exemplary aspect. It is noted that the following description of the exemplary method makes reference to the system and components described above. For example, method 300 can be performed by a data mining system 101, and is accordingly described with reference to FIG. 1, as a non-limiting example of an environment for carrying out method 300. Additionally, method 300 may be implemented on a computing device 10 (see FIG. 6) operating in the data mining system 101, and subcomponents of the computing device 10 may also be described below.

In method 300, at action 301, a subpopulation in a plurality of records is determined. In an example, the data mining module 101, e.g., in conjunction with processor 4 and memory 6, may query the data store 102 to determine a subpopulation in a dataset of records 105. Each record may include a plurality of items. The subpopulation may be a subset of the records having an indication in each record of whether the respective record is a member of the subpopulation. In one aspect, the subpopulation includes records from computing devices having a metric that indicates a system failure.

For example, the data mining module 101 may retrieve, from the data store 102, records of diagnostic data from a subpopulation of computing devices that failed in an attempted upgrade of its operating system. In this case, a data record of diagnostic data from a computing device includes a list of its hardware and software configuration as its "items". By applying a frequent-pattern algorithm to these "items" in the data records, the data mining module 101 may detect patterns of hardware and software configurations that might be common in failing computing devices. The data record further includes a field indicating whether the attempted upgrade was successful or not. A subpopulation as described herein is distinguished from a statistical sample of the dataset because the values in the data record itself indicate whether the record is a member of the subpopulation (of failed computing devices).

TABLE 1

Example Dataset of Records

| ID | HW and SW Config | Fail |
|----|------------------|------|
| 01 | B, C, A          | 1    |
| 02 | B, C, D          | 1    |
| 03 | B, D, A          | 1    |
| 04 | C, F, A          | 1    |
| 05 | B, C, A          | 1    |
| 06 | D, C, A, G       | 0    |
| 07 | F, C, A          | 0    |
| 08 | B, C, A          | 0    |

An example dataset of records is illustrated in Table 1. While the dataset contains eight records for sake of illustration, it is understood that the described technique may handle datasets having millions and even billions of data records. In an example, each record includes an unique identifier (e.g., "01", "02"), a list of hardware and software configurations, and an indication of whether the associated computing device has failed (e.g., a flag: "1", "0"). For example, the record ID-01 indicates a failed computing device (i.e., Fail=1) having a hardware and software configuration containing elements B, C, and A.

In an example, the unique identifier may be a device identifier such as, but not limited to, a universal unique identifier (e.g., UUID) associated with a computing device; in other cases, the unique identifier may be a record or transaction identifier. The list of hardware and software configurations have been simplified for illustration purposes to a list of simple characters (A, B, C, D, F, G), but it is understood that they represent any type of data element or characteristic on which data mining is to be performed. For example, the element "A" might represent the computing device has a graphics card model no. XYZ-98100; element "B" might represent the computing device has printer driver from company AB version 1.0.21, and so forth. It is further noted that while each record is shown with three or four items, a data record may have many more items, e.g., tens to hundreds or more of items representing a full inventory of hardware and software configurations of a computing device.

In an example, the subpopulation indication may be other types of fields besides a simple status flag, such as a continuous value of diagnostic data. In this case, to determine the subpopulation, the subpopulation may be queried for and retrieved using a conditional statement, such as comparing the diagnostic value to a threshold value associated with the subpopulation. For example, if an "overloaded" computing device were defined as any machine having a CPU load in excess of 5.0, then a subpopulation of records from overloaded machines may be determined by retrieving any records having a CPU_load field that is greater than this threshold value (e.g., "CPU_load>0.90"). Moreover, although one subpopulation is used as an example, multiple subpopulations may be tracked.

Using the example dataset of Table 1, the data mining module 101 may retrieve a subpopulation of records associated with failed computing devices based on the fail flag in the records (i.e., the records having IDs 01, 02, 03, 04, and 05), which is illustrated in Table 2 below.

TABLE 2

Example Subpopulation

| ID | HW and SW Config | Fail |
|----|------------------|------|
| 01 | B, C, A | 1 |
| 02 | B, C, D | 1 |
| 03 | B, D, A | 1 |
| 04 | C, F, A | 1 |
| 05 | B, C, A | 1 |

In method 300, at action 302, a list of frequent items may be generated using the records of the subpopulation. In an example, the frequent-item list generator 104, e.g., in conjunction with the processor 4 and memory 6 may generate a list of frequent items using the records of the subpopulation. The frequent-item list generator 104 may scan through the records of the subpopulation to count how many distinct characteristics of computing devices are encountered in the subpopulation (of failing machines). For example, the frequent-item list generator may take a list of all distinct components (e.g., A, B, C, D, F) and then count how many times the element A occurs, B occurs, and so forth. The list of frequent items may be sorted in decreasing order (i.e., most frequent items first, least frequent items last). An example frequent-item list is shown in Table 3 below.

TABLE 3

Example Frequent-Item List

| Item | Frequency |
|------|-----------|
| A | 4 |
| B | 4 |
| C | 4 |
| D | 2 |
| F | 1 |

According to Table 3, the items "A", "B", and "C" each occurred 4 times within the subpopulation of records (i.e., records 01-05). The list of frequent items may be generated based on a minimum-support level parameter, which is a tunable algorithm parameter that defines a (minimum) threshold level of frequency that an item must have for inclusion in the frequent-item list. The minimum-support level enables the described technique to ignore certain items (e.g., an obscure hardware device, or a rare installed software), which is useful in a high-dimension search space. In the example of Table 3, the items "D" and "F" have a frequency of 2 and 1, respectively, and therefore are excluded from a resulting frequent item list using a minimum-support parameter of 3.

It is noted that, in contrast to known FP algorithms, the described technique may use only the subpopulation of records to generate the frequent-item list, rather than the whole dataset. This use of the subpopulation can significantly impact the list during application of the minimum-support level. For example, the overall dataset in Table 1 includes a record ID-06 of a successful computing device having a hardware and software profile of "D, C, A, G" (i.e., includes the item "D"). Had this record been scanned during generation of the frequent-item list (as in the case of a conventional FP algorithm), the additional occurrence of the item "D" would have caused the item "D" to exceed the minimum-support level and into inclusion on the list. Using the described technique, the item "D" is instead excluded from the frequent-item list, thereby providing an improved, more accurate identification of frequent patterns related to failing computing devices.

In one aspect, the frequent-item list may be further generated based on a maximum-support parameter, which is similar to the minimum-support parameter, except it defines a maximum threshold frequency that an item must be less than for inclusion in the frequent-item list. That is, items in the records of the subpopulation occurring in excess of the maximum-support parameter are excluded from the list of frequent items, thereby removing from consideration any items that are overly popular or ubiquitous. For example, the described frequent-pattern algorithm might be executed using a maximum-support parameter of 5, which results in the exclusion of overly-popular or ubiquitous hardware or software configurations from patterns related to the failing machines. Excluding such over-represented items may improve the speed and complexity of executing the described algorithm because such items would not need to be counted or handled when building the prefix tree, as described later.

In method 300, at action 303, a prefix tree may be generated using the plurality of records and based on the list of frequent items generated using the records of the subpopulation. In an example, the frequent-pattern tree generator 106, e.g., in conjunction with the processor 4 and memory 6, may generate a prefix tree 110 using the (entire) plurality of records and based on the frequent-item list (which was generated using only the records of the subpopulation).

In an example, the frequent-pattern tree generator 106 may scan through the entire plurality of records which includes records for both failed and successful machines (i.e., the general population). The prefix tree is updated for each record of the plurality of records that is read. In an example, for each record, starting with a root node of the prefix tree and with a first item of the record, updates or adds a child node (of the root node) that matches the first item in the record, in an iterative or recursive manner. The selected child node acts as a root node for a next iteration, in which a next item of the record is considered. This continues until all items in the record have been processed. Each node includes an accumulator structure that includes, in this example, two separate counts of records associated with that node. When updating a node of the prefix tree, a first count (i.e., a subpopulation count) of records is incremented if the record being analyzed is a member of the subpopulation; a second count (i.e., a general count) of records is incremented either way. The algorithm for building a prefix tree is described in further detail in conjunction with FIG. 4.

FIG. 4 is a flowchart of an example of a method 400 for generating a prefix tree for extracting population-normalized frequent patterns from a dataset of records, according to an exemplary aspect. It is noted that the following description of the exemplary method makes reference to the system and components described herein. For example, method 400 can be performed by a data mining system 101, and is accordingly described with reference to FIG. 1, as a non-limiting example of an environment for carrying out method 400. Additionally, method 400 may be implemented on a computing device 10 (see FIG. 6) operating in the data mining system 101, and subcomponents of the computing device 10 may also be described below. The method 400 is described in conjunction with FIGS. 5A to 5I, depicting the building of an example prefix tree 500.

In the method 400, at action 401, a first record is selected from the plurality of records 105. In an example, the frequent-pattern tree generator 106, e.g., in conjunction with the processor 4 and the memory 6, may retrieve a first record from the dataset of records 105 stored in the data store 102. For example, the frequent-pattern tree generator 106 selects the first record ID-01 having the items (B, C, A).

At action 402, the selected record may be sorted based on the order of the frequent-item list. For example, the first record having the items (B, C, A) is re-ordered in descending order of frequency to (A, B, C). This re-ordering enables the prefix tree to have common paths. In another example, a record having the items (B, D, A) is re-ordered to (A, B, D) based on the order of items in the frequent-item list which indicates items A and B are more frequent than item D, which was omitted from the frequent-item list altogether. In some aspects, the re-ordering action further filters out any items that are not contained in the frequent-item list, such items D, G, and F from records 04, 06, and 07. In other aspects, these items may be disregarded (or "pruned") during the later steps. Table 4 provides the earlier example dataset of records with an additional column depicting each record sorted based on the frequent-item list. The present discussion will hereafter refer to a record's items by its sorted state.

TABLE 4

Example Dataset of Records (Sorted)

| ID | HW and SW Config | Config (Sorted by freq.) | Fail |
|---|---|---|---|
| 01 | B, C, A | A, B, C | 1 |
| 02 | B, C, D | B, C, D | 1 |
| 03 | B, D, A | A, B, D | 1 |
| 04 | C, F, A | A, C, F | 1 |
| 05 | B, C, A | A, B, C | 1 |
| 06 | D, C, A, G | A, C, D, G | 0 |
| 07 | F, C, A | A, C, F | 0 |
| 08 | B, C, A | A, B, C | 0 |

At action 403, the first item in the (sorted) record is selected. For example, the item "A" is selected. At action 404, it is determined whether the root node has a child node matching the first item in the record. If so, that child node is selected for traversal. It is noted that an initial state of the prefix tree 500 includes a root node with no child nodes. As such, in this example, no child node is found that matches the "A" item.

At action 405, responsive to determining that the root node does not have a child node matching the first item in the record, a new child node 501 is created. In an aspect, each node of the prefix tree may have a label (e.g., "A") identifying the item which matches that corresponding node. For example, each node may have a label of the hardware/software characteristic of a computing device, a count of failing machines have that characteristic in its (sorted) configuration, and a general count of all machines that have that characteristic in its configuration. Each node may further include an accumulator, which maintains a first count (element 502) of records from the subpopulation matching the respective node and a second count (element 504) of records from the entire plurality of records matching the respective node. In the described implementation, these counts are initialized to zero.

In some aspects, each node may include additional metrics or information analyzed while scanning with records. In an example, each node may include a representative list of unique identifiers associated with records that match that node. For example, the first child node created in FIG. 5A for the item "A" may add a device identifier (e.g., UUID) of the failed machine to its representative list of records that match the node A. This representative list may be used later to perform supplemental analysis or follow-up diagnostics of failed machines, for example, without needing to re-run a research of the records. In some aspects, the representative list may be added to a node if the node is a terminal node (i.e., leaf node).

In the method 400, at action 406, a determination is made whether the record is a member of the subpopulation. If so, at action 406, the first count of records from the subpopulation matching the respective node, in the child node, is incremented. At action 408, in the selected child node, the second count of records from the general population that match the respective node is incremented. For example, in FIG. 5A, the subpopulation count of matching records in the first node for item A is incremented to 1 based on a determination that the failure flag (i.e., "Fail=1") is set to true for this record. As such, the accumulator in the first child node for item A has been incremented to {1,1}. For sake of illustration, the updated portions of the prefix tree have been depicted in a different background shade in FIGS. 5A to 5I.

In the method 400, at action 409, it is determined whether all items in the record have been processed. If not, the operation proceeds in an iterative or recursive manner to process the next item in the record (action 403). For example, in FIG. 5A, the processing of record ID-01 continues with its second item, "B". The previously traversed child node labelled "A" acts as a root node for this iteration. As a result, a child node labelled "B" is created and linked from the node labelled "A", having its subpopulation count of matching records set to 1 and its general population count of matching records also set to 1. Lastly, the item "C" in the record ID-01 is processed, resulting in creation of a child node labelled "C" with counts {1,1}. Overall, the prefix tree 500 has been updated based on the record (A, B, C) to create a path of nodes denoted as Root→A→B→C.

Figure 5A:
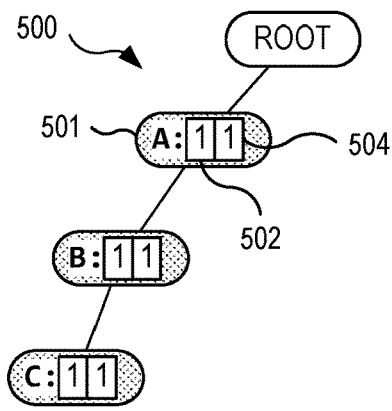
FIGS. 5A to 5I are block diagrams depicting the building of an example prefix tree according to an exemplary aspect.
Figure 5B:
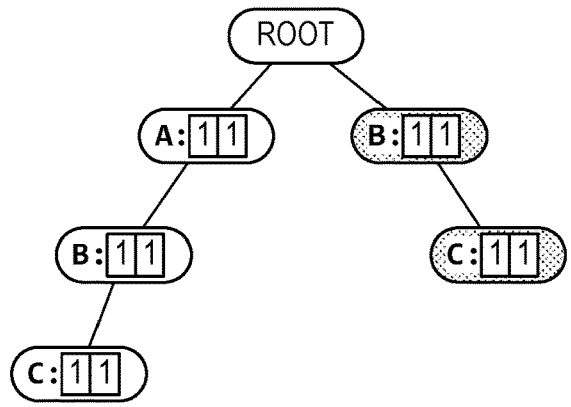

When all the items in the record have been processed, the operation loops to a next record in the dataset (see action 401). The actions of method 400 continue until all records have been mapped to a path in the prefix tree 500. For example, FIG. 5B depicts a state of the prefix tree 500 after processing a next record ID-02 from a failed machine having the items (B, C, D). As shown, additional child nodes labelled B and C are created as linked from the root node, resulting in a path Root→B→C. Each child node B and C has its accumulator set to {1,1} because record ID-02 is from a failed machine (i.e., subpopulation). The item D is disregarded because item "D" is not included in the frequent-item list and not used to build the prefix tree. Although nodes labelled "B" and C" already exist in the prefix tree (as children of node A), new child nodes are created as a separate branch because the record of (B, C, D) does not share a common prefix with the record ID-01 of (A, B, C).

Figure 5C:
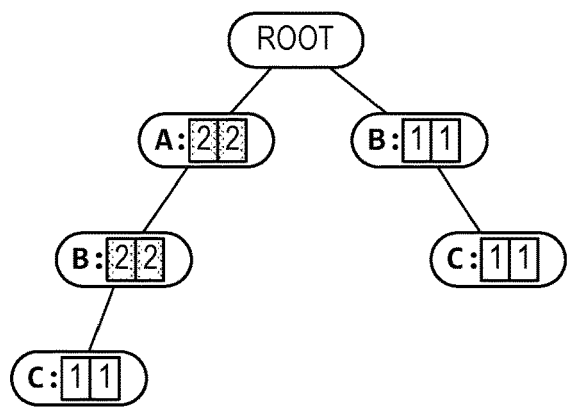

FIG. 5C depicts a state of the prefix tree 500 after processing a next record ID-03 having the items (A, B, D). The record ID-03 shares a common prefix with the record ID-01, therefore the path for records 01 and 03 will overlap in the prefix tree. As a result, the existing child nodes for A and B in the path Root→A→B are updated by incrementing their respective accumulators by 1 to yield {2,2}. The subpopulation count was incremented by 1 based on a determination that the record ID-03 is a member of the subpopulation (i.e., failed machine). Again, the item D is disregarded in this iteration because of its lack of minimum support.

Figure 5D:
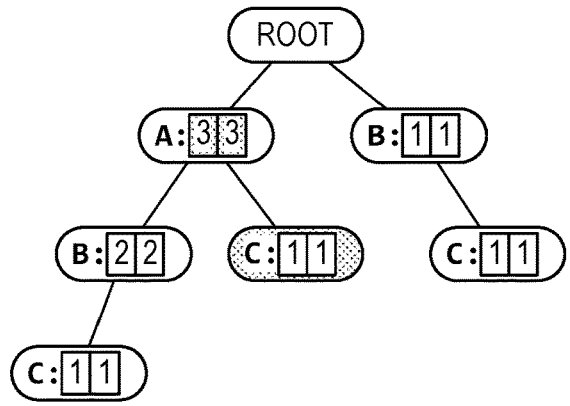

FIG. 5D depicts a state of the prefix tree 500 after being updated based on the next record ID-04 having the items (A, C, F). The record shares a common prefix of "A" with other records, and so the existing child node for A in the path Root→A is updated by incrementing its accumulator by 1 to yield to {3,3} based on a determination that the record ID-04 is a member of the subpopulation (i.e., Fail=1). As for the remainder of the record that does not share a common prefix, a new child node labelled C is created as linked from the node A in the path Root→A→C, with its accumulator set to {1,1}. In this case, the item F in the record ID-04 is omitted from the prefix tree because of a lack of minimum support.

Figure 5E:
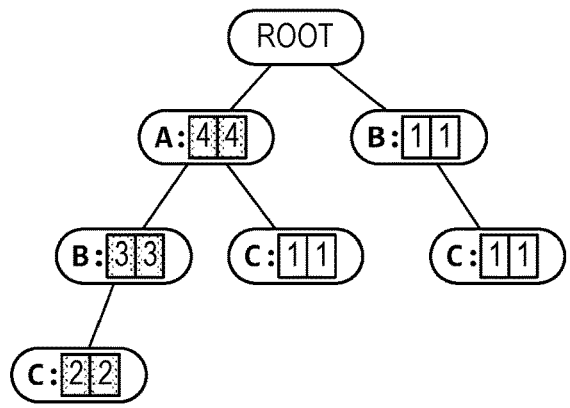

FIG. 5E depicts a state of the prefix tree 500 after being updated based on a next record ID-05 having the items (A, B, C). The record ID-05 shares a common prefix (in fact, a common item list) with record ID-01, so the paths for these records overlap in the prefix tree. As shown, the accumulators in the existing child nodes for A, B, and C in the path Root→A→B→C are updated to {4,4}, {3,3}, and {2} respectively.

Figure 5F:
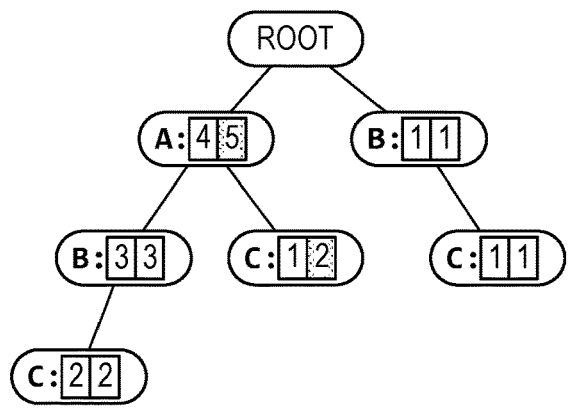
Figure 5G:
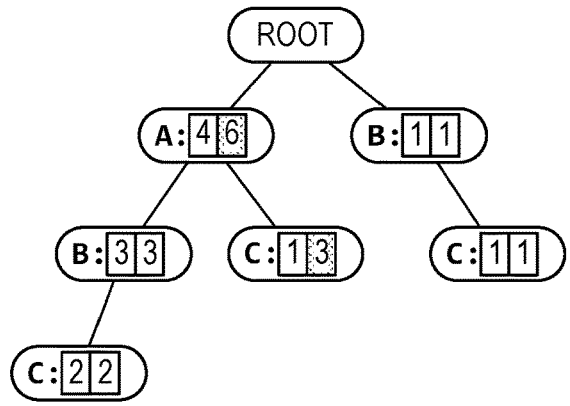

FIG. 5F depicts a state of the prefix tree 500 after processing a next record ID-06 having the items (A, C, D, G). As shown, the accumulators in the existing child nodes for A and C in the path Root→A→C are updated. Unlike the records processed to date, the record ID-06 is not a member of the subpopulation (i.e., Fail=0). Therefore, only the (second) count of matching records in the general population in each node is incremented. As such, the accumulator in the child node for A is updated to {4,5}; and the accumulator in the child node for C is updated to {1,2}. The items D and G omitted from the prefix tree because of a lack of minimum support (i.e., they do not occur frequently enough in the records of the subpopulation).

Similarly, FIG. 5F depicts a state of the prefix tree 500 after processing a next record ID-07 having the items (A, C, F). As in the case of the previous record, the accumulators in the child nodes for A and C in the paths Root→A→C are updated to increment the count of matching records in the general population because the record ID-07 is not a member of the subpopulation. As such, the accumulators are updated to {4,6} and {1,3} respectively. Item F has been omitted from the prefix tree due to a lack of minimum support.

Figure 5H:
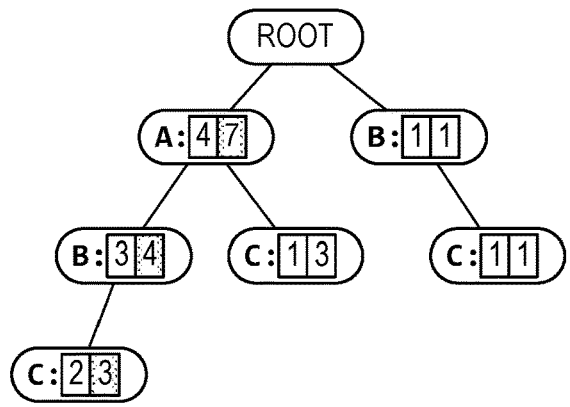

FIG. 5H depicts a state of the prefix tree 500 after being updated by the last record ID-08 having the items (A, B, C). The record ID-08 shares a common prefix with at least records ID-01 and ID-05, and as such, the accumulators in the existing nodes for A, B, and C in the path Root-→A→B→C are updated. Only the count of matching general population records is incremented by 1 because the record ID-08 is not a member of the subpopulation (i.e., Fail=0). As such the accumulators of nodes A, B, and C are updated to {4,7}, {3,4}, and {2,3}, respectively. It is noted that the described technique maintains a consistent data structure regardless of the order in which the records are retrieved from the data store. For example, if the record ID-08 of (A, B, C) of a non-failing machine was processed first among all records, the resulting prefix tree would be the same. That is, no structure is lost in the prefix tree because the counting is still correctly maintained with separate counts, even though it was a non-failing machine.

Figure 5I:
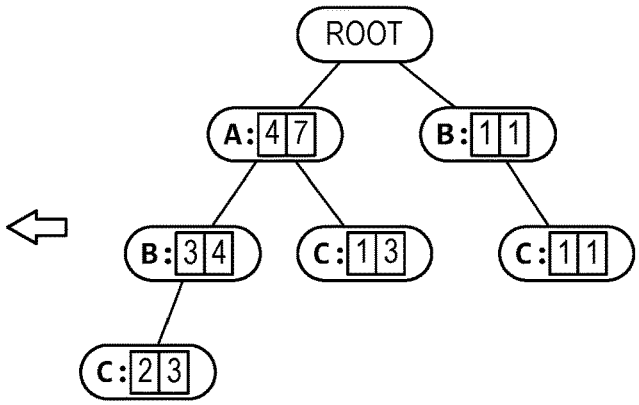

FIG. 5I represents a final state of the prefix tree 500 after completing a (single) scan through the entire dataset of records ID-01 to ID-08. In some aspects, generation of the prefix tree may also include the creation of one or more links between nodes, which enable traversal of nodes having a common label. For example, a first node labeled "C" may form a lateral linked list with the other nodes labeled "C" so as to facilitate finding common patterns using the tree. Other aspects may further includes a header table or summary table comprised of the heads of all such linked lists. The header table and linked lists are omitted from the Figures for simplicity of illustration.

Referring back to method 300, at action 304, one or more population-normalized frequent patterns associated with the plurality of records may be extracted based on a traversal of the prefix tree. In an example, the pattern extractor 108, e.g., in conjunction with the processor 4 and the memory 6, may extract one or more population-normalized frequent patterns from the records using the information contained in the prefix tree 110 and the structure itself of prefix tree 110.

In one aspect, the population-normalized frequent patterns may be extracted by, at action 305, extracting "candidate" frequent patterns based on a traversal of the prefix tree. In an example, the pattern extractor 108 may traverse the prefix tree 110 to a terminal node, and the path taken in this traversal is an extracted "candidate" frequent pattern. The extracted frequent pattern is considered a "candidate" pattern because it has not yet been normalized to the populations of the dataset of records. The counts of records associated with this extracted pattern may be calculated as the sum of the corresponding counts in the terminal nodes taken together. In an aspect, the counts of records associated with the extracted pattern may be calculated using the "combine" operator to combine the accumulators in the terminal nodes together. This operation may be performed in a recursive manner across all terminal nodes of the prefix tree 110.

In one aspect, for each extracted candidate pattern, a subpopulation-match total, which is a total count of records in the subpopulation that match the candidate frequent pattern, may be calculated by summing the respective first count in terminal nodes during traversal of the prefix tree. Similarly, for each extracted candidate pattern, a general-match total, which is a total count of records that match the candidate pattern, may be calculated by summing the respective second count in terminal nodes during traversal of the prefix tree. In an example, the pattern extractor 108 may generate a total accumulator for each candidate pattern by performing additive operations between all accumulators encountered in terminal nodes during a bottom-up traversal of the prefix tree 110. Table 5 provides an example listing of extracted candidate patterns and their respective total accumulators.

TABLE 5

Example Extracted Patterns

| Candidate Patterns | Total accumulator | Ratio |
|---|---|---|
| A, B, C | {2, 3} | 66.66% |
| A, C | {3, 6} | 50% |
| B, C | {3, 4} | 75% |

In an example, a candidate pattern (A, B, C) is extracted using the prefix tree example (prefix tree 500) shown in FIG. 5I, and has a total accumulator of {2, 3}. That is, the total accumulator {2, 3} indicates a (subpopulation-match) total of 2 records of the subpopulation match this candidate pattern, and a (general-match) total of 3 records of the general population match this candidate pattern. In another example, a candidate pattern (A, C) is extracted using the above-described example prefix tree 500. This candidate pattern (A, C) has a total accumulator of {3, 6} which is obtained by performing an additive operation to merge the accumulator {2,3} of the node C (in the path Root→A→B→C) and the accumulator {1,3} of the node C in the path Root→A→C (i.e., {2,3}+{1,3}={3,6}).

In another example, a candidate pattern (B, C) is extracted with a total accumulator {3, 4}, meaning a total of 3 records of the subpopulation match a pattern (B, C) and a total of 4 records in the general population match the pattern. This indicates that there were 3 failures out of 4 machines matching the pattern (B, C). The total accumulator of the candidate pattern (B, C) may be calculated by performing an additive operation to merge the accumulator {2,3} of the terminal node C in the path Root→A→B→C with the accumulator {1,1} of the terminal node C in the path Root→B→C (i.e., {2,3}+{1,1}={3,4}).

In method 300, at action 306, the population-normalized frequent patterns may be further determined by selecting one or more candidate patterns as a population-normalized frequent pattern based on a comparison of ratios involving the subpopulation-match total (for that pattern) and the general-match total (for that candidate pattern). It is understood that a number of heuristics using the subpopulation-match totals and general-population match totals from the total accumulators can be used to check whether a candidate pattern is overrepresented in the subpopulation or is merely popular in the general population.

In one aspect, an overall subpopulation frequency may be calculated as the ratio of the count of subpopulation records S to the count of all records (i.e., general population N). For example, an overall failure rate may be calculated by dividing the number of failed machines by the total number of machines. Using the above data set, the overall failure rate may be calculated as 62.5% (i.e., 5 failed/8 total). Then, for each candidate pattern, a normalized pattern frequency may be calculated as a ratio of the subpopulation-match total ($P_S$) to the general-population match total ($P_N$), which will account for how popular a particular pattern is within the general population. In one aspect, a frequent pattern can be characterized as a population-normalized frequent pattern if the normalized pattern frequency for that pattern is greater than or equal to the overall subpopulation frequency, as expressed by the relationship in Equation (1) below.

$$\frac{P_S}{P_N} \geq \frac{S}{N} \qquad (1)$$

For example, using the above example in Table 5, the normalized pattern frequency for the candidate pattern (B, C) is calculated as 75% (i.e., 3/4=0.75). This normalized pattern frequency of 75% exceeds the overall failure rate of 62.5%, and therefore the pattern (B, C) is classified as a population-normalized frequent pattern. In another example, the candidate pattern (A, C) has 3 failures out of 6 total devices, and therefore has a normalized pattern frequency of 50% (i.e., 3/6=0.50), which is less than the overall failure rate of 62.5%. As such, the candidate pattern (A, C) may be excluded or disregarded as a frequent pattern. It is noted that in this case, even though the candidate pattern (A, C) had just as many failures as the candidate pattern (B, C), i.e., 3 failures, the algorithm refrained from selecting the candidate pattern (A, C) as a frequent pattern due to the overall popularity of the hardware and software configuration represented by the pattern (A, C) in the general population (i.e., 6 matched machines). As such, using the described technique, aspects of the present disclosure is able to account for the frequency of a given pattern in the general population of records without needing to resort to an additional scan or search of a frequent pattern tree.

In an equivalent formulation, a candidate pattern may be selected as a population-normalized frequent pattern based on a comparison of (i) a ratio of a subpopulation-match total for that candidate pattern ($P_S$) to a count of the subpopulation (S) and (ii) a ratio of a general-match total for that candidate pattern ($P_N$) to a count of the entire plurality of records (N). This relationship is expressed in Equation (2) below.

$$\frac{P_S}{S} \geq \frac{P_N}{N} \qquad (2)$$

In an example application of this formulation, consider again the earlier-described dataset of records for 1 million machines, out of which 10,000 suffered a failure in an operating system upgrade (i.e., N=1,000,000; S=10,000). Based on an analysis of the records, a candidate pattern (Z, W) may be extracted representing machines that had an anti-virus software Z and a certain network card W. The total accumulator for this candidate pattern might be {500, 5000}. As such, it is determined that the ratio of the subpopulation-match total $P_S$ to the count of subpopulation S is 5% of all failed machines (i.e., 500/10,000=0.05), which exceeds the ratio of the general-match total $P_N$ to the count of all records N, which is 0.5% of all machines (i.e., 5000/1,000,000=0.005). As a result, the pattern (Z, W) can be classified as a population-normalized frequent pattern.

In method 300, at action 307, a list of the population-normalized frequent patterns may be displayed to the user. In an example, the pattern extractor 108, e.g., in conjunction with the processor and a display device, may rank order the population-normalized frequent patterns and display the patterns in order to the user. In one aspect, the pattern extractor 108 may determine a degree of departure from the overall failure rate, for example, calculated as a difference between the overall failure rate and the failure rate for that pattern, and rank the patterns in a descending order by distance. In another example, the pattern extractor 108 may rank the normalized patterns based on a number of incidences, for example, how many failing machines fit that pattern (the pattern with the most incidences being ranked first).

While depicted as a single instance, it is understood that the data mining module 101 may be implemented in a distributed architecture having multiple nodes (each node executing an instance of the data mining module 101) that analyze the dataset of records 105 in parallel. In an example, the dataset of records 105 may be partitioned into chunks, each chunk being scanned by a different computing node to create a partial frequent-item list. These intermediate partial frequent-item lists may be merged to single frequent-item list, to which the minimum support level is applied. In a further example, each node then generate a subtree of the prefix tree 110 using a chunk of the dataset of records, which are then merged to form an overall prefix tree. In another example distributed implementation, the described technique may be configured using a MapReduce-based architecture. For example, a Map step may be configured that partitions the subpopulation of records into further subsets for a task node to generate frequent-item sub-lists, and a Reduce step that merges the resulting sub-lists into a frequent-item list. In another example, a Map step may be configured such that a task node builds a portion or sub-tree of a prefix tree based on a subset of the dataset of records, which are merged during a Reduce step.

It has been determined that, if a system attempted to use the traditional FP-growth algorithm or other frequent pattern algorithms to solve the technical problem of mining items in a dataset of records to find frequent patterns which account for the overall popularity of that pattern in the general population, such a system would have to first mine the patterns in the subpopulation, and then count the number of records that match the resulting patterns in the general population. For example, a system would have to first mine for frequent patterns in the subpopulation of failing PCs (using a first and second pass through the dataset), and then re-scan the entire dataset again to count the number of PCs that match each of those resulting patterns in the general population (in a third pass through the dataset). This third pass through the dataset can result in conventional algorithms exhibit upper-bound $3^{rd}$-degree polynomial complexity. The use of the monoid algebraic structure as described herein allows for the creation of multiple counters in one pass through the dataset while constructing the prefix tree, thus providing computation time savings from not having to perform a population-pattern-matching third pass through the dataset.

In another conventional solution to the above-stated technical problem of finding population-normalized frequent patterns, a system might be configured to take small statistical samples from the whole set of subpopulation and general populations (e.g., failing machines and all machines). However, this would produce a sub-optimal solution due to the limitations inherent to statistical sampling, such as sampling bias. In contrast, the described technique enables a system to use the full dataset for finding frequent patterns, thus enabling the system to narrow down potential issues with greater, improved accuracy.

Figure 6:
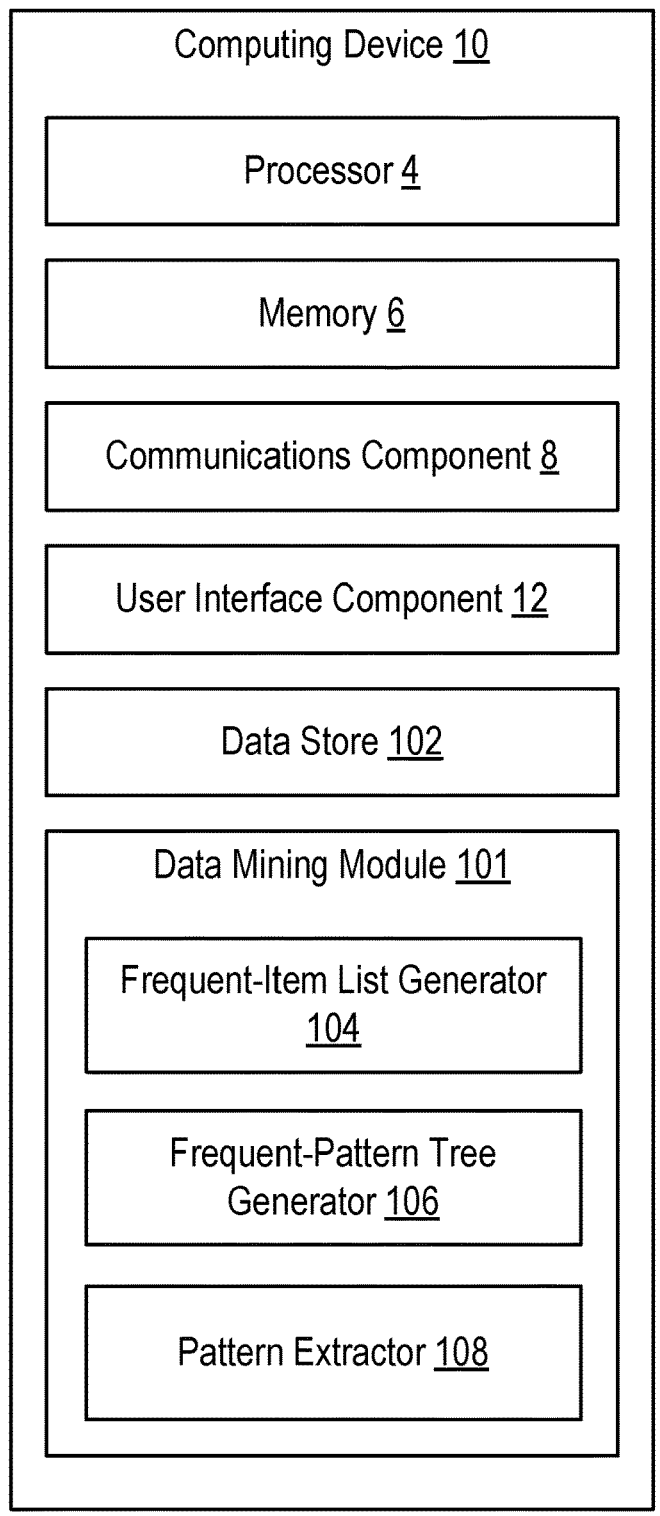
FIG. 6 is a block diagram of a computer system on which the disclosed system and method can be implemented according to an exemplary aspect.

FIG. 6 illustrates an example of computing device 10 including additional optional component details as those shown in FIG. 1. In one example, computing device 10 may include a processor 4 for carrying out processing functions associated with one or more of components and functions described herein. Processor 4 can include a single or multiple set of processors or multi-core processors. Moreover, processor 4 can be implemented as an integrated processing system and/or a distributed processing system.

Computing device 10 may further include memory 6, such as for storing local versions of applications being executed by processor 4, related instructions, parameters, etc. Memory 6 can include a type of memory usable by a computer, such as random access memory (RAM), read only memory (ROM), tapes, magnetic discs, optical discs, volatile memory, non-volatile memory, and any combination thereof. Additionally, processor 4 and memory 6 may include and execute an operating system executing on processor 4, one or more applications, display drivers, etc., as described herein, and/or other components of the computing device 10.

Further, computing device 10 may include a communications component 8 that provides for establishing and maintaining communications with one or more other devices, parties, entities, etc. utilizing hardware, software, and services as described herein. Communications component 8 may carry communications between components on computing device 10, as well as between computing device 10 and external devices, such as devices located across a communications network and/or devices serially or locally connected to computing device 10. For example, communications component 8 may include one or more buses, and may further include transmit chain components and receive chain components associated with a wireless or wired transmitter and receiver, respectively, operable for interfacing with external devices.

Additionally, computing device 10 may include a data store 102, which can be any suitable combination of hardware and/or software, that provides for mass storage of information, databases, and programs employed in connection with examples described herein. For example, data store 102 may be or may include a data repository for applications and/or related parameters not currently being executed by processor 4. In addition, data store 102 may be a data repository for an operating system, application, display driver, etc. executing on the processor 4, and/or one or more other components of the computing device 10.

Computing device 10 may also include a user interface component 12 operable to receive inputs from a user of computing device 10 and further operable to generate outputs for presentation to the user (e.g., via a display interface to a display device). User interface component 12 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, user interface component 12 may include one or more output devices, including but not limited to a display interface, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for data mining a plurality of records to identify one or more patterns, comprising:
    determining a subpopulation in the plurality of records, wherein the subpopulation comprises a subset of the records held in a same database, wherein each record in the database has an indication of whether the respective record is a member of the subpopulation, such that a first record in the database indicates membership in the subpopulation and a second record in the database indicates non-membership in the subpopulation, and wherein each record comprises a plurality of items;
    generating a list of one or more frequent items occurring within the records of the subpopulation with at least a threshold frequency;
    generating a prefix tree using the plurality of records and based on the list of frequent items generated using the records of the subpopulation, wherein each node in the prefix tree includes an accumulator having at least: (i) a first count of records from the subpopulation matching the respective node and (ii) a second count of records from the plurality of records matching the respective node; and
    based on the first counts and the second counts of the accumulators in the prefix tree, extracting one or more population-normalized frequent patterns associated with the plurality of records, the population-normalized frequent patterns corresponding to patterns having a higher frequency of occurrence within the subpopulation of records as compared to a corresponding frequency of occurrence in the plurality of records.

2. The method of claim 1, wherein extracting the population-normalized frequent patterns further comprises:
    extracting a candidate pattern by traversing the prefix tree;
    calculating a subpopulation-match total of records in the subpopulation that match the candidate pattern by summing the respective first count in terminal nodes during traversal of the prefix tree;
    calculating a general-match total of records that match the candidate pattern by summing the respective second count in terminal nodes during traversal of the prefix tree; and
    selecting the candidate pattern as a population-normalized frequent pattern based on a comparison of (i) a ratio of the subpopulation-match total to the subpopulation and (ii) a ratio of the general-match total to the plurality of records.

3. The method of claim 1, wherein generating the prefix tree using the plurality of records and based on the list of frequent items generated using the records of the subpopulation further comprises:
    updating, for each record of the plurality of records, the prefix tree, comprising:
        proceeding, starting with a root node of the prefix tree and with a first item of the record, to select a child node of the root node that matches the first item in the record and update the accumulator of the child node based on the record, in an iterative or recursive manner, with the child node acting as the root node for a next iteration, and a next item of the record acting as the first item for the next iteration, until all items in the record have been processed, wherein the accumulator of the child node is updated by:
            incrementing, in the child node, the first count of records in response to determining that the record is a member of the subpopulation; and
            incrementing, in the child node, the second count of records from the plurality of records matching the child node.

4. The method of claim 3, wherein selecting the child node of the root node that matches the first item in the record further comprises:
    responsive to determining that the root node has a child node matching the first item in the record, selecting the child node for traversal; and
    responsive to determining that the root node does not have a child node matching the first item in the record, creating a new child node having a label matching the first item.

5. The method of claim 1, wherein the accumulator comprises a Monoid algebraic structure.

6. The method of claim 1, wherein the list of frequent items is generated based on at least one of a maximum-support parameter or a minimum-support parameter, wherein items in the records of the subpopulation occurring in excess of the maximum-support parameter or fewer than the minimum-support parameter are excluded from the list of frequent items.

7. The method of claim 1, wherein each node of the prefix tree further comprises a list of representative identifiers of records that match that node.

8. The method of claim 1, wherein the subpopulation comprises records from computing devices having a metric that indicates a system failure.

9. A computing device for data mining a plurality of records to identify one or more patterns, comprising:
   a memory storing one or more records of the plurality of records, each record comprising a plurality of items;
   at least one processor coupled to the memory, wherein the at least one processor is configured to:
      determine a subpopulation in the plurality of records, wherein the subpopulation comprises a subset of the records held in a same database, wherein each record in the database has an indication of whether the respective record is a member of the subpopulation, such that a first record in the database indicates membership in the subpopulation and a second record in the database indicates non-membership in the subpopulation database;
      generate a list of one or more frequent items using occurring within the records of the subpopulation with at least a threshold frequency;
      generate a prefix tree using the plurality of records and based on the list of frequent items generated using the records of the subpopulation, wherein each node in the prefix tree includes an accumulator having at least: (i) a first count of records from the subpopulation matching the respective node and (ii) a second count of records from the plurality of records matching the respective node; and
      based on the first counts and the second counts of the accumulators in the prefix tree, extract one or more population-normalized frequent patterns associated with the plurality of records, the population-normalized frequent patterns corresponding to patterns having a higher frequency of occurrence within the subpopulation of records as compared to a corresponding frequency of occurrence in the plurality of records.

10. The computing device of claim 9, wherein the processor configured to extract the population-normalized frequent patterns is further configured to:
   extract a candidate pattern by traversing the prefix tree;
   calculate a subpopulation-match total of records in the subpopulation that match the candidate pattern by summing the respective first count in terminal nodes during traversal of the prefix tree;
   calculate a general-match total of records that match the candidate pattern by summing the respective second count in terminal nodes during traversal of the prefix tree; and
   select the candidate pattern as a population-normalized frequent pattern based on a comparison of (i) a ratio of the subpopulation-match total to the subpopulation and (ii) a ratio of the general-match total to the plurality of records.

11. The computing device of claim 9, wherein the processor configured to generate the prefix tree using the plurality of records and based on the list of frequent items generated using the records of the subpopulation is further configured to:
   update, for each record of the plurality of records, the prefix tree, comprising:
      proceeding, starting with a root node of the prefix tree and with a first item of the record, to select a child node of the root node that matches the first item in the record and update the accumulator of the child node based on the record, in an iterative or recursive manner, with the child node acting as the root node for a next iteration, and a next item of the record acting as the first item for the next iteration, until all items in the record have been processed, wherein the accumulator of the child node is updated by:
         incrementing, in the child node, the first count of records in response to determining that the record is a member of the subpopulation; and
         incrementing, in the child node, the second count of records from the plurality of records matching the child node.

12. The computing device of claim 11, wherein the processor configured to select the child node of the root node that matches the first item in the record is further configured to:
   responsive to determining that the root node has a child node matching the first item in the record, select the child node for traversal; and
   responsive to determining that the root node does not have a child node matching the first item in the record, create a new child node having a label matching the first item.

13. The computing device of claim 9, wherein the accumulator comprises a Monoid algebraic structure.

14. The computing device of claim 9, wherein the list of frequent items is generated based on at least one of a maximum-support parameter or a minimum-support parameter, wherein items in the records of the subpopulation occurring in excess of the maximum-support parameter or fewer than the minimum-support parameter are excluded from the list of frequent items.

15. The computing device of claim 9, wherein each node of the prefix tree further comprises a list of representative identifiers of records that match that node.

16. The computing device of claim 9, wherein the subpopulation comprises records from computing devices having a metric that indicates a system failure.

17. A computer-readable medium storing code executable by one or more processors for data mining a plurality of records to identify one or more patterns, the code comprising instructions for:
   determining a subpopulation in the plurality of records, wherein the subpopulation comprises a subset of the records held in a same database, wherein each record in the database has an indication of whether the respective record is a member of the subpopulation, such that a first record in the database indicates membership in the subpopulation and a second record in the database indicates non-membership in the database subpopulation, and wherein each record comprises a plurality of items;
   generating a list of one or more frequent items using occurring within the records of the subpopulation with at least a threshold frequency;
   generating a prefix tree using the plurality of records and based on the list of frequent items generated using the records of the subpopulation, wherein each node in the prefix tree includes an accumulator having at least: (i) a first count of records from the subpopulation matching the respective node and (ii) a second count of records from the plurality of records matching the respective node; and
   based on the first counts and the second counts of the accumulators in the prefix tree, extracting one or more population-normalized frequent patterns associated with the plurality of records, the population-normalized frequent patterns corresponding to patterns having a higher frequency of occurrence within the subpopulation of records as compared to a corresponding frequency of occurrence in the plurality of records.

18. The computer-readable medium of claim 17, wherein the instructions for extracting the population-normalized frequent patterns further comprises instructions for:
   extracting a candidate pattern by traversing the prefix tree;
   calculating a subpopulation-match total of records in the subpopulation that match the candidate pattern by summing the respective first count in terminal nodes during traversal of the prefix tree;
   calculating a general-match total of records that match the candidate pattern by summing the respective second count in terminal nodes during traversal of the prefix tree; and
   selecting the candidate pattern as a population-normalized frequent pattern based on a comparison of (i) a ratio of the subpopulation-match total to the subpopulation and (ii) a ratio of the general-match total to the plurality of records.

19. The computer-readable medium of claim 18, wherein the instructions for generating the prefix tree using the plurality of records and based on the list of frequent items generated using the records of the subpopulation further comprises instructions for:
   updating, for each record of the plurality of records, the prefix tree, comprising:
      proceeding, starting with a root node of the prefix tree and with a first item of the record, to select a child node of the root node that matches the first item in the record and update the accumulator of the child node based on the record, in an iterative or recursive manner, with the child node acting as the root node for a next iteration, and a next item of the record acting as the first item for the next iteration, until all items in the record have been processed, wherein the accumulator of the child node is updated by:
         incrementing, in the child node, the first count of records in response to determining that the record is a member of the subpopulation; and
      incrementing, in the child node, the second count of records from the plurality of records matching the child node.

20. The computer-readable medium of claim 17, wherein the list of frequent items is generated based on at least one of a maximum-support parameter or a minimum-support parameter, wherein items in the records of the subpopulation occurring in excess of the maximum-support parameter or fewer than the minimum-support parameter are excluded from the list of frequent items.

* * * * *